Nov. 8, 1955      L. R. CURTIS ET AL      2,723,368

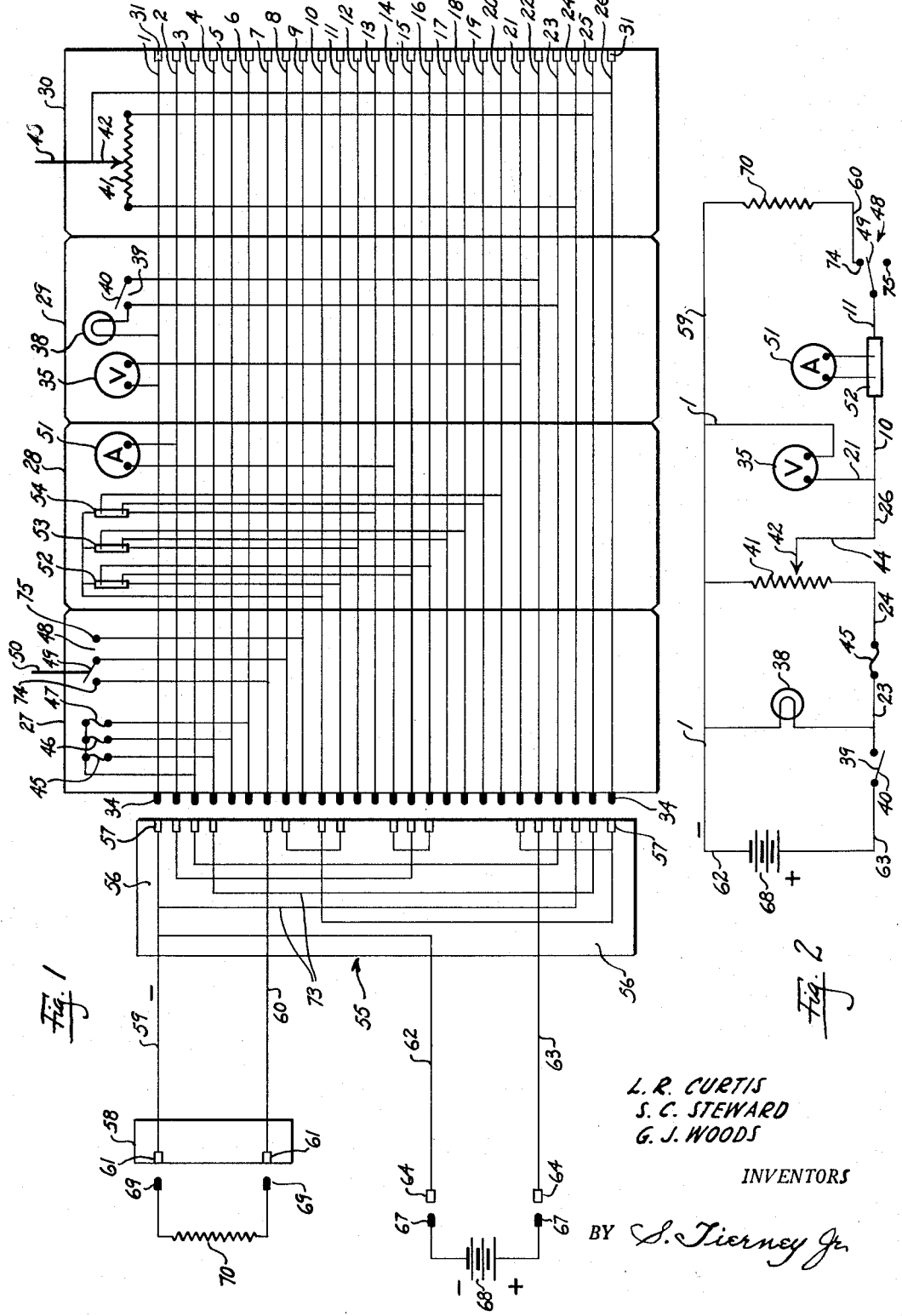

ELECTRICAL TESTING AND CONTROL INSTRUMENT

Filed Dec. 9, 1952      4 Sheets-Sheet 2

L. R. CURTIS
S. C. STEWARD
G. J. WOODS
INVENTORS

BY S. Tierney Jr.

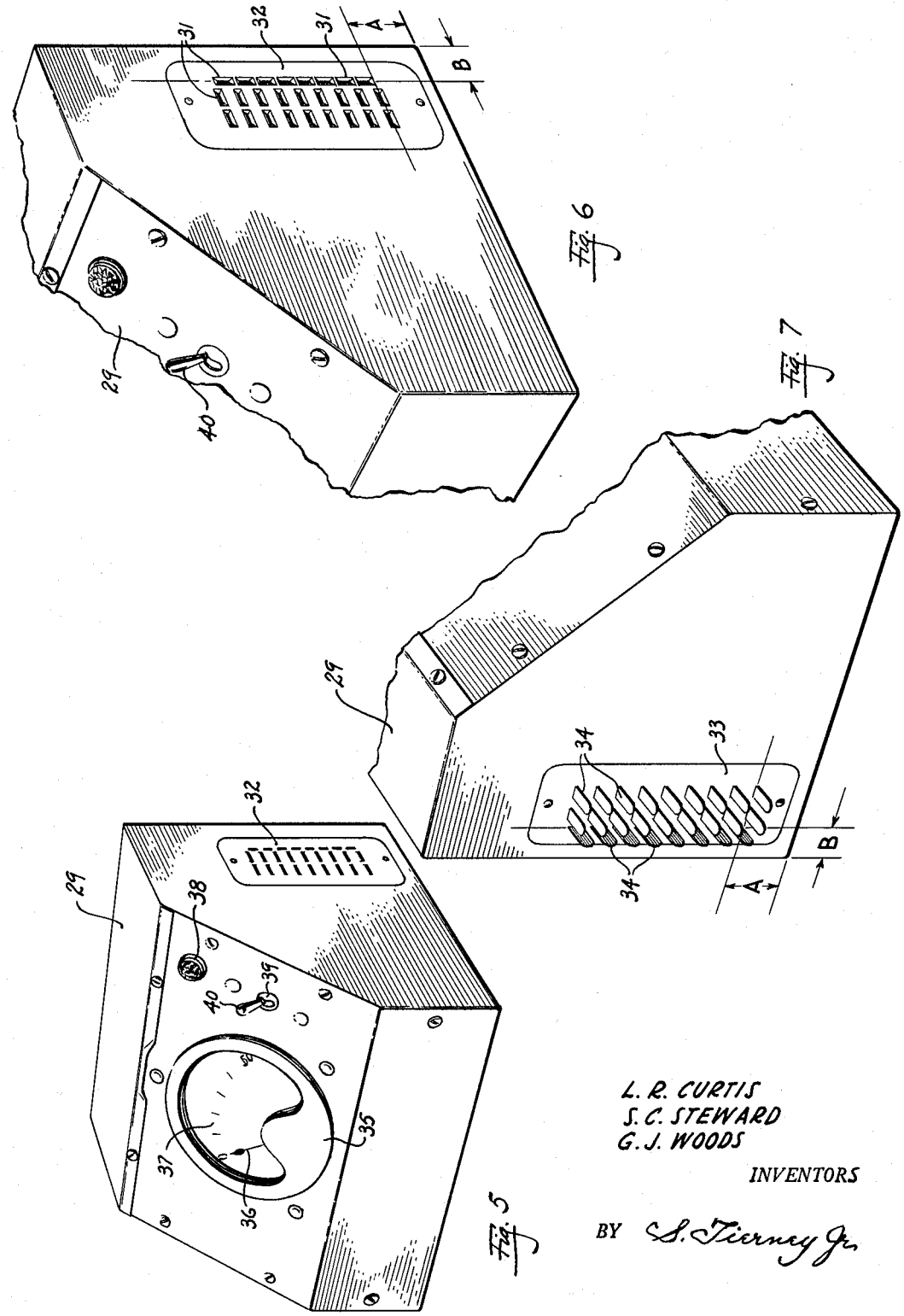

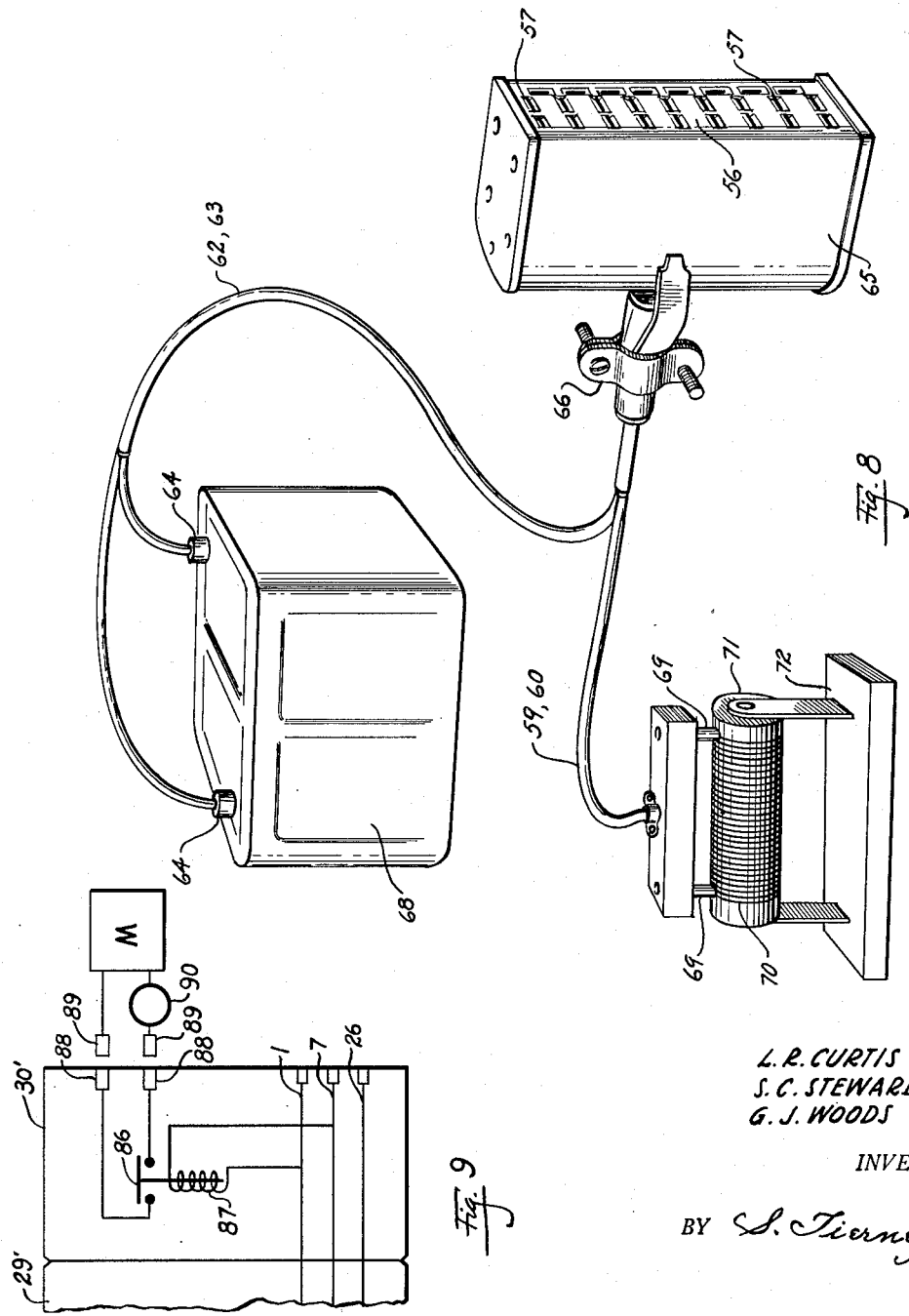

United States Patent Office 2,723,368
Patented Nov. 8, 1955

2,723,368
ELECTRICAL TESTING AND CONTROL INSTRUMENT

Lloyd R. Curtis, San Diego, Sidney C. Steward, Chula Vista, and George J. Woods, El Cajon, Calif., assignors to Rohr Aircraft Corporation, Chula Vista, Calif., a corporation of California Application December 9, 1952, Serial No. 325,008

10 Claims. (Cl. 317—99)

This invention relates to an electrical testing or control instrument in which different component parts are mounted in separate cases and the wiring to the several parts is so arranged that the cases may be connected together in any random order to establish the desired electrical connections between the components.

A further object is to provide a casing for an electrical unit in which a set of plugs projects from one end of the casing and a set of sockets spaced apart the same as the plugs is provided at the opposite end of the casing, correspondingly positioned plugs and sockets being connected together by wires. Short leads within the casing connect the terminals of the electrical unit to the several wires so that a current connection from an outside current source to the electrical unit may be established by connecting the source to either the plugs or sockets.

Another object is to provide a casing and internal connections to an electrical unit of the type described in which each connected pair of plugs and sockets are disposed at the same distances from the front and bottom of the casing so that when a casing is slid along a flat surface on which a second similarly wired casing is resting, the plugs of one casing will line up with and enter the sockets of the other, thereby providing a way to easily mechanically and electrically connect two or more electrical units together.

A further object is to provide a portable harness adapted to connect an electrical unit of the type described to a source of outside voltage and to also establish the proper electrical connections between the unit and the terminals of an electrical device or machine to be tested or controlled.

Further objects will become apparent as the description of one embodiment of the invention proceeds. For a better understanding of the invention reference is made to the accompanying drawings, in which:

Figure 1 is a schematic diagram of a testing unit including circuit diagram of an installation embodying the invention;

Figure 2 is a simplified schematic circuit diagram of the circuits of Figure 1;

Figure 3 is a diagram of the testing unit of Figure 1 modified to establish different circuit connections to test an electric motor;

Figure 4 is a simplified schematic circuit diagram of the circuits of Figure 3;

Figure 5 is a perspective view of an electrical unit embodying the invention;

Figure 6 is an enlarged perspective view of one end of the unit of Figure 5;

Figure 7 is a perspective view of the opposite end of the unit of Figure 5;

Figure 8 is a perspective view of a harness adapted for use with the testing installation of Figure 1, and Figure 9 is a schematic diagram of a modified form of the invention.

Referring to Figures 1 and 6 the testing installation illustrated comprises four supporting casings 27, 28, 29 and 30 of similar size and shape, each having a set of 26 sockets 31 set in an insulation block 32 mounted at the right hand end of the casing. Each casing also has an insulation block 33 mounted at its left hand end, this block carrying a set of 26 plugs 34 projecting from the end of the casing, the spacing between the plugs corresponding to that between the sockets and the distances A and B of the lowest plugs from the bottom of the casing and the rear line of plugs from the back of the casing are the same as the corresponding sockets at the other end of the casing, as shown in Figures 6 and 7. To connect any two casings together which are supported on a flat surface, it is merely necessary to slide one casing toward the other with its plugs opposite the sockets of the other until they enter the sockets. The casings are then mechanically connected together and the wires within the two casings conductively connected together. Each plug 34 is connected to the correspondingly positioned socket 31 of its casing by a wire, these wires being numbered from 1 to 26. If these wires are straight, they will be parallel to each other and each wire will be parallel to the bottom of the casing. This arrangement assures all the number 1 wires, for example, of four casings being conductively connected together when the casings are brought together to connect the plugs of one with the sockets of the next. It also assures all the wires of the same number being conductively connected together, irrespective of the order in which the casings are assembled together. The casings may be of any suitable shape and when a casing contains an electrical meter, the meter pointer or dial is visible from a position above the casing. Also when a casing contains a switch, rheostat or other control having a movable control member which effects the adjustment, the control member projects through the front or top of the casing and is operable from the exterior thereof. Casing 29, for example, as shown in Figure 5 contains a voltmeter 35 having an indicator 36 movable over a graduated scale 37, an indicating lamp 38 and a switch 39 having a control handle 40. As shown in Figure 1, the terminals of the voltmeter are connected to wires 1 and 21, one terminal of the lamp to wire 1 and its other terminal to a terminal of the switch which is connected to wire 23. The other switch terminal is connected to wire 22.

Casing 30 (see Figure 1) contains a current control means comprising resistor 41 whose terminals are connected to wires 24 and 25 and a slider 42 adjustable along the resistor by means of a handle 43 which has a portion extending outside the casing, as indicated. A lead 44 connects slider 42 to wire 26.

Casing 27 contains three fuses 45, 46, 47 and a single pole double throw switch 48 whose movable blade 49 is connected to wire 8 and whose contacts 74, 75 are connected to wires 7 and 9. One end of each of the fuses is connected to wire 3 and their other ends are connected to wires 4, 5 and 6 respectively. The fuses are of different current carrying capacities; 45 may, for example, be a 2 ampere fuse, 46 a 5 ampere one and 47 a 10 ampere fuse. It will be understood that additional fuses may be provided, if required, and that fuses of other capacities may be used instead. The handle 50 which operates switch blade 49 extends outside the casing, similar to switch handle 40.

Casing 28 contains an ammeter 51 whose terminals are connected to wires 2 and 14 and three ammeter shunts 52, 53 and 54 whose upper current terminals are connected together and to wire 10 and whose lower current terminals are connected to leads 11, 12 and 13. The meter terminals of shunt 52 are connected to wires 15 and 16, those of shunt 53 to wires 17, 18 and those of shunt 54 to wires 19, 20. In the illustrated example, the full scale reading of ammeter 51 when connected across shunt 52 is 2 amperes; the reading is 5 amperes when connected across shunt 53 and 10 amperes when connected across shunt 54. The shunts are preferably selected to give full scale meter readings corresponding to the maximum capacities of the fuses 45, 46 and 47. It will be understood that other types of electrical meters may be substituted for the voltmeter and ammeter shown, such as a wattmeter, oscilloscope, ohmmeter, frequency indicator, etc. The several casings are preferably of the same size and shape so that when assembled into a testing unit, their front faces line up and their top faces also.

A harness is used with the assembled casings to make a test, that shown in Figures 1 and 8 being indicated by numeral 55 and comprising an insulation block 56 housing 26 sockets of which 17 live sockets 57 are adapted to engage the plugs 34 connected to the ends of wires 1, 2, 3, 4, 7, 8, 10, 11, 14, 15, 16, 21, 22, 23, 24, 25, and 26 when block 56 is moved toward the right. A flexible cable connects block 56 with a second insulation block 58, the cable containing two wires 59, 60 connected at one end to a pair of sockets 61 in block 58 and at their other end to two of the sockets 57, as shown. The harness also comprises a second flexible cable having a pair of wires 62, 63 terminating in a pair of sockets 64 at one end and having their other end connected to two sockets 57. Block 56 is preferably housed in a metal casing 65 and a cable clamp 66 secures the end of the flexible cable to the casing. Sockets 64 are arranged to engage the terminals 67 of a storage battery 68 or other current source and sockets 61 are adapted to engage the terminals 69 at the ends of a wire resistance coil 70 to be tested, the coil being supported by a ceramic cylinder 71 mounted on a supporting base 72. Several of the sockets 57 are connected with other sockets by short wires 73 disposed within casing 65, as shown schematically in Figure 1.

To make an electrical test of a coil 70, the harness connections of Figure 8 are established and the sockets 57 moved over the plugs 34 to make conductive connections with the aforementioned wires within casings 27, 28, 29 and 30. This establishes the electrical circuit shown schematically in Figure 2. Handle 40 is moved to close switch 39 which then remains closed during the test. Current through lamp 38 causes it to light, this serving as an indication to the operator that power is available for the test. Current passes through fuse 45 (2 ampere capacity) and bleeder resistor 41. Handle 43 is then moved to adjust contact 42 along resistor 41 to impress the rated test voltage on voltmeter 35. Handle 50 is then moved to throw switch blade 49 against switch contact 74 thereby closing the circuit through ammeter shunt 52 and test coil 70. If the flow of current through the coil causes the voltage as indicated on meter 35 to fall off, slider 42 is adjusted along resistor 41 to restore the voltage applied across the coil to the predetermined specified value. By noting the voltage reading on meter 35 and the current reading on ammeter 51, the operator can tell at once whether the coil 70 under test meets the required specifications. Assuming that the rated capacity of coil 70 is 1.8 amperes at 20.0 volts, it will be noted that this current reading on meter 51 is near the upper end of its scale where the scale divisions are far apart, permitting accuracy in the reading. It will also be noted that the harness used does not provide any circuit connections to the lower ends of fuses 46 or 47 so that there is no danger of any current passing through either of these which would overload the coil under test and possibly burn it out. Also, the 2 ampere fuse carrying the current in the circuit protects ammeter 51 against overload.

Referring to Figures 3 and 4, the instrument is shown with a harness 79 wired for testing a reversible direct current motor 76 having a pair of oppositely wound series field coils 77, 78. The insulation block $56^1$ of the harness carries a set of sockets 57 arranged for connection to wires 1, 2, 3, 6, 7, 8, 9, 10, 13, 14, 19, 20, 21, 22, 23, 24, 25, and 26 when plugged in. The harness includes a flexible cable containing the wires $62^1$, $63^1$ for connection to battery 68 and a cable containing three wires 80, 81, 82 terminating in sockets 83 set in an insulation block 84. Sockets 83 are adapted to engage the three motor terminals 85.

When a motor is to be tested, harness 79 is connected to the battery, motor and test unit to establish the circuit connections shown schematically in Figure 4. The closure of switch 39 causes current to flow through 10 ampere fuse 47 and bleeder resistor 41. Slider contact 42 is then set to provide the desired input voltage for motor 76. Switch blade 49 is then moved to engage contact 74 which closes the circuit through series winding 78 and the armature of motor 76. Slider 42 is then readjusted, if necessary, to bring the voltage applied to the motor (as read on meter 35) to the rated value. The reading on ammeter 51 will indicate whether or not the motor is drawing current in excess of the rated amount and the speed of the motor and any other of its characteristics may be determined. When the test for that direction of rotation is completed, switch 48 is opened and the motor allowed to stop. Switch blade 49 is then moved to engage contact 75 which closes the motor circuit through series winding 77 and causes the motor to rotate in the reverse direction. Slider 42 is readjusted, if necessary, to establish the rated voltage and then the meter readings, motor speed and any other motor characteristic determined.

It will be noted that harness 55 is designed especially for the testing of coils 70 and is not interchangeable with harness 79 for this purpose, the latter harness being designed especially for the testing of series wound motors such as 76. From the above it will be clear that where a large number of electrical devices of any type need to be tested, a special harness is designed having contacts designed to fit the terminals of one of the devices and sockets arranged to engage the proper plugs 34. The largest capacity fuse used and the shunt for ammeter 51 will be chosen in accordance with the maximum current required by the device. While a battery 68 has been illustrated as the current source, it will be understood that an alternating current source of either audio or radio frequency may be used instead. By selecting the proper type of voltmeter and ammeter, it is possible to easily and quickly test the alternating current characteristics of a device by making a harness to fit its terminals and establish the proper circuit connections to the several electrical devices contained within casings 27 to 30. If additional meters are required for certain measurements they may be mounted in an additional casing or casings to be connected to the sockets 31 of casing 30 and a number of additional wires connected between the ends of each casing similar to wires 1 and 2.

When large currents of the order of 50 amperes or more must be supplied to a machine M (Figure 9) being tested or controlled, instead of a bleeder resistor 41, the end casing $30^1$ has mounted within it a solenoid operated switch 86 the ends of whose coil 87 are connected to wires 1 and 7. The switch terminals are connected by heavy wires to a pair of large sockets 88 into which fit mating plugs 89 connected to current generator 90 and the terminals of machine M. When the operator closes switch 48 (Figure 1, coil 70 not being connected in circuit) current passes through solenoid coil 87 causing switch 86 to close and complete the circuit through generator 90 and operate the machine. The other 23 wires running from end to end of casing $30^1$ are omitted for clarity.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described our invention, what we claim as new and useful and desire to secure by Letters Patent is:

1. An electrical instrument adapted to be quickly connected to a plurality of spaced apart electrical terminals comprising, in combination: a rigid casing; a plurality of pairs of leads extending between opposite ends of the casing, each of said leads having secured to one end a plug projecting from one end of the casing and to its opposite end a socket shaped to receive the plug, said sockets being mounted within the opposite end of the casing; an ammeter supported by the casing; two conductors within the casing connecting the terminals of said meter with a pair of said leads; an ammeter shunt mounted within the casing; two conductors within the casing connecting the current terminals of said shunt with another pair of said leads; and two conductors within the casing connecting intermediate points of said shunt with a third pair of said leads.

2. An electrical instrument as claimed in claim 1, in which a member formed of insulation material is provided with at least four spaced apart receptacles adapted to fit over four of said plugs and two short conductors connecting said receptacles together in pairs.

3. An electrical control device adapted to be quickly connected to a plurality of spaced apart electrical terminals comprising, in combination: a rigid casing; a plurality of leads extending between opposite ends of the casing, each of said leads having secured to one end a plug and to its opposite end a socket shaped to receive the plug; a voltage divider mounted within the casing and having a pair of input terminals and an adjustable output terminal; two conductors within the casing connecting said input terminals with a pair of said leads; and a third conductor within the casing connecting said output terminal to a third of said leads.

4. An electrical control device adapted to be quickly connected to a plurality of spaced apart electrical terminals comprising, in combination: a rigid casing; a plurality of leads extending between opposite ends of said casing, each of said leads having secured to one end a plug and to its opposite end a socket shaped to receive the plug; a plurality of fuses mounted within the casing, each fuse having a different current-carrying capacity than the other fuses; a conductor within the casing connecting one end of each of said fuses with one of said leads; and separate conductors within the casing connecting the opposite ends of said fuses with other of said leads.

5. An electrical control device adapted to be quickly connected to a plurality of spaced apart electrical terminals comprising, in combination: a rigid casing; at least five leads extending between opposite ends of said casing, each of said leads having secured to one end a plug and to its opposite end a socket; a switch supported within the casing; a handle extending outside the casing for operating said switch two conductors within the casing connecting the points of said switch to two of said leads; two fuses of different current-carrying capacity mounted within the casing; a conductor within the casing connecting one end of both said fuses with a third of said leads; and separate conductors within the casing connecting the opposite ends of said fuses with the fourth and fifth leads.

6. A harness adapted to quickly connect the terminals of an electrical device to be tested with a source of voltage and a current control device having a plurality of spaced apart output terminals comprising, in combination: a rigid supporting member formed of insulating material; a plurality of spaced apart contacts mounted in said supporting member; a metal casing closely surrounding said supporting member and having an open end through which said contacts are visible; short leads disposed in said casing and connecting certain of said contacts together in pairs; flexible conductors having one end permanently connected to a plurality of said contacts and their other end provided with connectors arranged for quick attachment to the terminals of the voltage source; additional contacts in said supporting member mounted for sliding engagement with the output terminals of the current control device; and flexible conductors having one end permanently connected to said additional contacts and their other end provided with connectors arranged for quick attachment to the terminals of the device to be tested.

7. A harness adapted to provide a plurality of quick electrical connections comprising, in combination: a rigid supporting member formed of insulating material; at least six spaced apart contacts mounted in said supporting member; short leads connecting said contacts together in pairs; a pair of spaced apart input contacts mounted in said supporting member; flexible conductors having one end permanently connected to said input contacts and their other end provided with connectors arranged for quick attachment to the terminals of a voltage supply source; a pair of spaced apart output contacts mounted in said supporting member; and flexible conductors having one end permanently connected to said output contacts and their other end provided with connectors arranged for quick attachment to two electrical terminals, all of said contacts having end portions lying in a common plane whereby they may be simultaneously connected to a plurality of mating contacts.

8. A harness adapted to quickly make a plurality of electrical connections comprising, in combination: an enclosing casing; a supporting block formed of insulation material mounted in said casing; at least five spaced apart contacts mounted in said block and having an end of each contact exposed for a connection to external circuits; two short wires disposed within said casing and connecting four of said contacts together in pairs; and a pair of flexible leads, one lead having one end disposed within said casing and connected to the fifth contact and the other lead having one end disposed within said casing and connected to one of said wires.

9. An electrical instrument adapted to transmit current to a load having two terminals and to measure the voltage and amplitude of the current, said instrument comprising: first and second casings, each casing having a plurality of spaced apart plugs projecting from one end and a plurality of spaced apart sockets in its opposite end, the spacing between consecutive sockets being the same as the spacing between consecutive plugs and each socket being disposed at the same elevation as its corresponding plug; leads within each casing connecting said plugs to the corresponding sockets; an ammeter mounted within the first casing having its terminals connected to first and second of said leads therein; a shunt mounted within the first casing and having its ends connected to third and fourth of said leads therein; connections between spaced apart points of said shunt and fifth and sixth of said leads within said first casing; a voltmeter within said second casing having its terminals connected to said leads therein; and a harness having two flexible wires connected to the terminals of said load and a rigid supporting member; said supporting member having a plurality of spaced apart sockets in engagement with the plugs of said first casing; and a plurality of short conductors which, together with the leads within said casings, connect said voltmeter across the load and connect said ammeter across said spaced apart points of the shunt.

10. An electrical unit adapted to be connected in series between a pair of similar units by sliding the similar units along a flat support disposed under the three units comprising, in combination: a casing having parallel end walls; an insulation block mounted in one end wall; at least eight spaced apart plugs mounted in said block and having prongs projecting beyond said one end wall; a second insulation block mounted in the other end wall; at least eight spaced apart sockets mounted in said second block, the spacings between consecutive sockets being the same as the spacings between the prongs of consecutive plugs and each socket being disposed at the same distance above the support as the prong of its corresponding plug; separate leads disposed entirely in said casing connecting said plugs to the correspondingly positioned sockets; an electrical measuring instrument mounted within the casing and visible from a position above the casing; and conductors connecting the terminals of said instrument to a plurality of said leads.

References Cited in the file of this patent

UNITED STATES PATENTS

| | | |
|---|---|---|
| 2,030,857 | Dingley | Feb. 18, 1936 |
| 2,233,646 | Smith | Mar. 4, 1941 |
| 2,299,140 | Hanson | Oct. 20, 1942 |
| 2,492,733 | Burchell | Dec. 27, 1949 |

OTHER REFERENCES

Radio-Craft for January, 1939. Pages 400, 401 and 431.